May 27, 1958 J. PINSKY ET AL 2,836,319
COATED PLASTIC ARTICLES
Filed Aug. 13, 1957

INVENTORS
Albert E. Adakonis
Alvin R. Nielsen
and Jules Pinsky
BY
Burns, Doane, Benedict & Lyons
ATTORNEYS

United States Patent Office

2,836,319
Patented May 27, 1958

2,836,319

COATED PLASTIC ARTICLES

Jules Pinsky, West Hartford, Albert E. Adakonis, East Hartford, and Alvin R. Nielsen, Hartford, Conn., assignors to Plax Corporation, Bloomfield, Conn., a corporation of Delaware Application August 13, 1957, Serial No. 678,000

20 Claims. (Cl. 215—1)

This invention relates generally to synthetic resin articles and more particularly to synthetic resin articles, such as sheets, bottles and containers, which have enhanced resistance to permeation by fluids. More specifically, the invention is directed to plastic articles, such as polyethylene containers and bottles, a surface of which is modified by application of a coating thereto to prevent or reduce the rate of permeation of the synthetic resin material by many of the commonly encountered fluids, particularly organic liquids.

Synthetic resin containers and bottles as, for example, polyethylene bottles, have become widely popular as a packaging means for various liquids such as deodorants, hair preparations, cosmetic preparations, medicinal preparations, and the like. In particular, polyethylene has been and is widely used in the production of squeeze bottles for the distribution of such preparations in that it is relatively inert, has the necessary flexibility to function as a squeeze bottle, and can be easily fabricated in quantity at a reasonable cost. Unmodified polyethylene is entirely satisfactory for a wide variety of materials. However, polyethylene and other synthetic resins which are useable as containers are permeable to many organic liquids, including a large number of conventional organic solvents which are widely used in fluid preparations for which the polyethylene bottle or container is highly desirable. Representative chemicals, for example, which permeate with various degrees of rapidity through polyethylene at room temperature, include the straight chain hydrocarbons, the aromatic hydrocarbons, esters, ketones, and various other non-polar fluids. Consequently, because of this high permeability characteristic of polyethylene and other synthetic resin materials from which containers are desirably fabricated, the use of these materials has of necessity been restricted to those products to which the resin is substantially impermeable. The permeable characteristics of polyethylene with respect to certain of these chemicals has resulted in polyethylene bottles being rejected for use in applications where, due to its flexibility and ease of fabrication, it might otherwise be employed to great advantage.

It has previously been suggested that polyethylene bottles be lined with such materials as polyvinyl alcohol, polyvinyl chloride and copolymers of polyvinyl chloride and polyvinyl acetate to obtain an oil resistant film which will resist permeation by oily materials. While such liners have been moderately successful, there is currently no known liner material which will form a flexible coating on a polyethylene surface and which will resist permeation by a wide variety of organic fluids such as toluene, hexane, carbon tetrachloride, ethyl acetate, and the like.

In view of the problems as above set forth relating to the use of synthetic resin containers and bottles, particularly those produced from polyethylene, it is a primary object of this invention to provide a plastic article which is characterized by enhanced resistance to permeation by a variety of fluids.

It is another object of this invention to provide a container or bottle formed from a synthetic resin, a surface of which carries a flexible coating which will prevent permeation of the resinous container structure by a variety of commonly employed organic fluids.

It is an additional object of this invention to provide a polyethylene bottle having a flexible, resinous coating on the interior and/or exterior surface thereof which is characterized by enhanced resistance to permeation by a variety of organic fluids, particularly the common hydrocarbon solvents.

It is another object of the present invention to provide a polyethylene bottle having a flexible, adherent, synthetic resin coating which is substantially impermeable to many organic fluids capable of substantially permeating the polyethylene bottle walls in the absence of such coating.

A further object of the invention is a lined container or bottle formed from a synthetic resin, preferably polyethylene, which is highly flexible and useable in "squeeze bottle" applications without deleterious effect on the container or bottle, to retain organic fluids without objectionable loss due to their permeation of the container or bottle.

In co-pending application Serial No. 574,383, filed March 28, 1956, and of which the present application is a continuation-in-part, it is disclosed that excellent resistance to permeation of synthetic resinous containers by a variety of commonly employed organic fluids may be obtained by lining and/or coating the surface thereof with a cured epoxy resin. Containers, and particularly polyethylene bottles coated or lined with cured epoxy resin compositions, have proved highly successful as containers for such organic fluids as carbon tetrachloride, toluene, ethyl acetate, acetone, benzene, oils and compositions containing such materials. While these coated or lined containers have generally exhibited requisite flexibility for many commercial applications, the increased use of squeeze bottles, especially as dispensers for cosmetics, medicants, air fresheners, cleaning fluids, household lubricants, and the like, make it desirable to employ a liner characterized by maximum flexibility without adversely affecting the resistance of the lined container to fluid permeation.

In accordance with the present invention, it has now been discovered that liners and coatings of enhanced flexibility and having excellent resistance to permeation by a wide variety of organic fluids may be obtained by a particular combination of epoxy resins with a hardener. Generally described, the present invention comprises a synthetic resin article having a surface characterized by enhanced resistance to permeation by fluids, said surface having a coating of the cured mixture of:

A. An epoxy resin composition containing by weight from about 90 to about 10% of the reaction product of epichlorhydrin, p,p'dihydroxy-diphenyldimethyl methane and epihydric alcohol and from about 10% to about 90% of the reaction product of epichlorhydrin and dimethyl, p-hydroxyphenyl, p-hydroxy-m-(p-hydroxybenzyl)phenyl methane, and B. The reaction product of epichlorhydrin and p,p'dihydroxy-diphenyldimethyl methane;

said A and B being admixed in a ratio of between about 1:1 and about 50:1. It has been found that if the limiting ranges in A and the limiting ratios between A and B are not observed, the desired high flexibility and low permeation characteristics are not obtained. Preferably a ratio of between 5:1 and 15:1 will be employed.

In a more specific embodiment the invention comprises a synthetic resinous container, a surface of which has a coating of the cured epoxy resin composition of the invention. In its preferred embodiment the invention comprises a polyethylene bottle, a surface of which has a coating of the cured epoxy resin composition of the invention.

Any of the conventional hardeners may be employed to cure the epoxy resin composition of the invention. Epoxy resins may be readily hardened or cured to an insoluble, infusible state by reaction of the epoxy and hydroxyl groups with cross-linking agents including diamines or polyamines, such as metaphenylene diamine, diethylene triamine and the polyethylene polyamines; diisocyanates, such as methylene bis-(4 phenyl) isocyanate; dialdehydes, such as glyoxal; dimercaptans; and amides and polyamides, such as those disclosed in U. S. Patent No. 2,705,223. Preferably, the epoxy resin mixture of the invention will be cured by a hardener admixed therewith in a ratio between about 1:1 and about 10:1 by weight. Particularly desirable curable mixtures will contain epoxide and hardener in a ratio of between about 4:1 and about 6:1 by weight. The coatings applied to the synthetic resin surfaces in accordance with this invention are the cured or hardened epoxy resins obtained by reaction of the particular admixture of peroxides of the invention with a hardener or cross-linking agent for epoxy resins.

It is often desirable to chemically pretreat the plastic substrate to render the material more receptive to polar compounds and thus promote enhanced adherence of the coating or lining material. In U. S. Reissue Patent No. 24,062 to Horton, it is disclosed that improved adherence of polar compounds to polyethylene may be effected by treating the surface to be printed, lined or coated with a solution of sulfuric acid and a dichromate. U. S. Patents 2,715,075, 2,715,076 and 2,715,077 to Wolinski disclose that desired surface modification may be obtained by treatment with ozone, nitrous oxide or mixtures of the two. Suitable surface modification also may be obtained by flame treating the surface to be printed, coated or lined, such as shown in U. S. Patents 2,632,921 and 2,704,382 to Kreidl. All of these treatments involve the oxidation of the plastic surface and, in many instances, the conversion of an initially hydrophobic surface to a hydrophilic surface. However, hydrophilic resinous surfaces may also be rendered more receptive to polar compounds by sulfonation or chlorination.

Thus the degree of adherency of the coatings or liners to the articles or containers of the invention will vary, depending on the nature of the substrate being coated. The coating applied to untreated polyethylene and other normally hydrophobic materials in accordance with the invention is adherent in the sense that the coating clings to the substrate when applied and does not separate during normal usage to a degree deleteriously affecting the resistance to permeation of the coated or lined surface. Where for reasons of optimum performance and/or appearance a more strongly adherent coating or liner is desired, suitable surface pretreatment preferably will be employed.

The epoxy resin of the invention is preferably applied to the surface to be lined or coated in an uncured state, dissolved in a suitable solvent such as toluene, methyl ethyl ketone, and the like. Preferably, sufficient solvent is employed to produce a solids content between about 35% and about 75%. The coating may be applied by conventional techniques, such as by spraying, or manually by at least partially filling the bottle followed by suitable manipulative and draining steps to insure the application of an even coating to the interior surface. If the coating is applied to the exterior surface of the article, it need simply be immersed in a bath of the coating material and allowed to drain. Exterior coatings also may be applied by spraying techniques. Where the coatings of the invention are applied by spray techniques, it is especially desirable to chemically pretreat the substrate and thus insure enhanced continuity and adhesion of the coating.

The cured coating or lining is produced in situ by subjecting the coated article to a curing temperature for a period of time necessary to produce the desired chemical reaction. Desirably, the coating will be cured at a temperature of 190–220° F. for a period of at least a half hour. Shorter periods of time may obviously be employed with higher curing temperatures. The curing time and temperature will also be varied by the amount and type of catalyst or hardening agent employed. If desired, the lined or coated objects may be allowed to stand for an extended period, e. g., twenty-four to seventy-two hours at room temperature prior to being cured at higher temperature, thus reducing the time required for the advanced temperature curing operation. The softening point of the plastic being coated generally constitutes the upper limit of the curing temperature and for unmodified polyethylene this upper limit is about 220° F.

In the accompanying drawing illustrative embodiments of the invention are presented.

Figure 1:
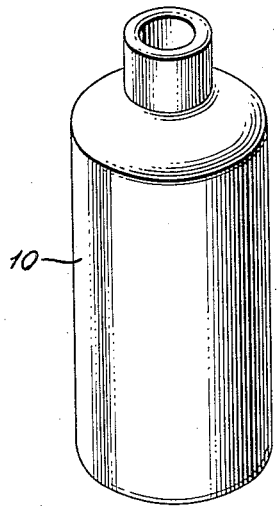
Figure 1 is an elevational view of a conventional Boston Round polyethylene bottle 10 which has not been modified in accordance with the invention.
Figure 2:
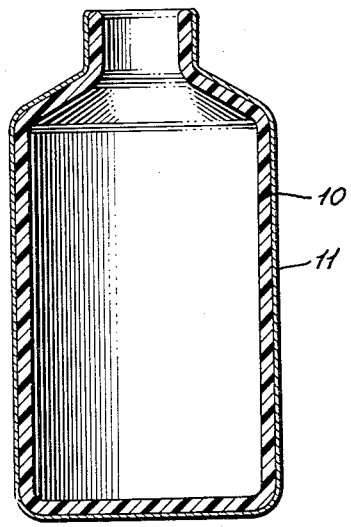
Figure 2 is a sectional view of a similar polyethylene bottle 10 having a continuous external coating 11 of the cured epoxy resin composition of the invention.
Figure 3:
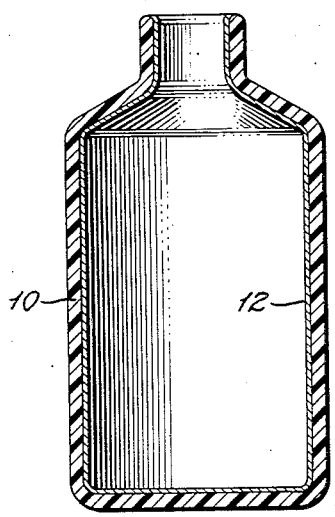
Figure 4:
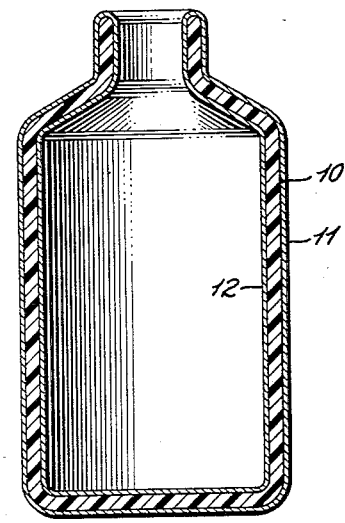

Figure 3 is a sectional view of a similar polyethylene bottle 10 having a continuous internal lining 12 of the cured epoxy resin composition of the invention; and Figure 4 is a sectional view of a similar polyethylene bottle 10 having both a continuous exterior coating 11 and a continuous interior lining 12 of the cured epoxy resin composition of the invention.

Having generally described the invention, the following examples are presented for purposes of illustrating various specific embodiments thereof. For purposes of brevity in the examples, the epoxy resins employed in accordance with the invention will be referred to as Epoxy Resin A or B as identified below.

(A)

(1) 65% 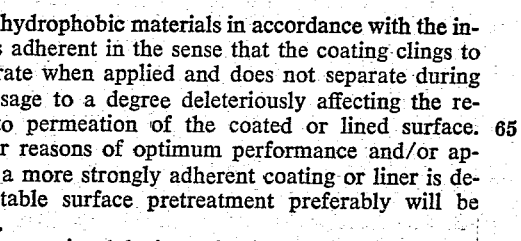

(A reaction product of epichlorhydrin, p,p'dihydroxy diphenyl dimethyl methane and epihydric alcohol)

(A)

(2) 35% 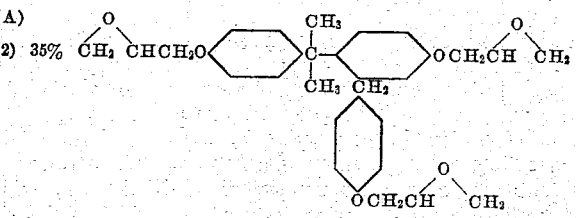

(A reaction product of epichlorhydrin and dimethyl, p-hydroxy phenyl, p-hydroxy-o-(p-hydroxy benzyl) phenyl methane)

(B)

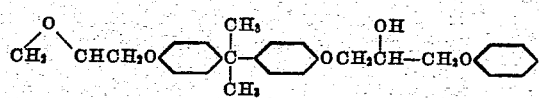

(A reaction product of epichlorhydrin and p,p'dihydroxy diphenyl dimethyl methane)

Similarly, the preferred hardener or cross-linking agent employed in the examples also will be referred to as hardener C. It will be understood, however, that other hardeners or cross-linking agents as referred to hereinabove and as known to the art as hardeners or cross-linking agents for epoxide resins may be substituted for hardener C. Hardener C is identified below.

was diluted with methyl ethyl ketone to a solids content of about 60%. Four-ounce Boston Round polyethylene bottles were lined by the procedure of Example I and the bottles were initially cured for ten hours at room temperature followed by heating for two hours at 165° F. The weights of the liners applied ranged from 0.573 to 0.706 grams. Groups of three of the lined bottles were

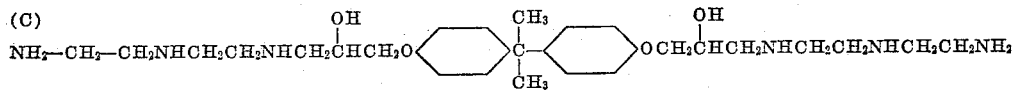

(C) $NH_2-CH_2-CH_2NHCH_2CH_2NHCH_2CHCH_2O\langle\ \rangle\underset{CH_3}{\overset{CH_3}{C}}\langle\ \rangle OCH_2CHCH_2NHCH_2CH_2NHCH_2CH_2NH_2$ with OH groups on the CH positions.

The inner surfaces of all of the lined polyethylene bottles employed in the examples were treated prior to lining to oxidize the surfaces and thus render them more receptive to polar compounds. In all cases the lined bottles prepared as in the examples could be flexed repeatedly as in squeeze-bottle operation without deleterious effect on the liner or the permeability characteristics of the bottle. Unless otherwise indicated, all parts are by weight.

EXAMPLE I

Resin A and resin B were admixed in a ratio of 10:1. Four parts of the admixture of A and B and one part of hardener C were then admixed and diluted with methyl ethyl ketone to a solids content of 60%. The interior surfaces of 4-ounce Boston Round polyethylene bottles were manually lined by the pour-in, pour-out technique and the liners were cured at 164° F. for two hours and had an average weight of 0.57 gram. The lined bottles and an equal number of unlined control bottles were filled with a commercial cigarette lighter fluid which heretofore had been found to be an extremely fast permeator of unlined polyethylene bottles. Part of the bottles in accordance with the invention and part of the unlined control bottles were stored at 73° F. for twenty-eight days and the remainder of the two groups of bottles were stored at 120° F. for a period of twenty-eight days. On the basis of the difference in weight before and after storage, it was determined by calculation that the percent weight loss per year at 73° F. for the lined bottles was 1% while the percent weight loss per year of the unlined bottles was 402%. For the bottles stored at 120° F. the calculated percent weight loss per year for the lined bottles was 2.4% and for the unlined controls was 1006.0%.

EXAMPLE II

Additional 4-ounce Boston Round polyethylene bottles lined in accordance with the procedure of Example I were prepared. In this instance the liners were cured at 190° F. for one hour and had an average weight of 0.6841 gram. The lined bottles and unlined control bottles were filled with a commercial electrical joint compound containing 50% petrolatum and, as active ingredients, included amino compounds and fluorides. The lined and unlined bottles were stored at 73° F. and 120° F. as in Example I. The calculated annual weight loss of the bottles stored at 73° F. was 4.57% for the unlined control bottles but there was no discernable weight loss for the lined bottles. In the bottles stored at 120° F. the calculated annual weight loss for the unlined control bottles was 37.9% but only 2.13% for the lined bottles. The unlined bottles stored at both 73° F. and 120° F. had collapsed, while no collapse whatsoever was noted in the case of the lined bottles at either storage temperature.

EXAMPLE III

Resin A and resin B were admixed in a ratio of 10:1. Eight parts of the admixture of A and B were then admixed with one part of hardener C and the admixture filled with hexane, toluene, ethyl acetate and carbon tetrachloride and stored at 73° F. for 124 days. The average weight loss in grams per day of the lined bottles as compared to unlined control bottles is shown below.

| Test Fluid | Unlined Bottles | Lined Bottles |
|---|---|---|
| n-Hexane | 2.2 | 0.0150 |
| Toluene | 2.79 | 0.0106 |
| Ethyl Acetate | 0.095 | 0.0016 |
| Carbon Tetrachloride | 3.49 | 0.023 |

EXAMPLE IV

A lining solution was prepared from 35.5 parts of resin A, 3.5 parts of resin B and 9.7 parts of hardener C. The mixture was diluted with methyl ethyl ketone to a solids content of 65%, and 4-ounce Boston Round polyethylene bottles were spray lined on a conventional Paasche spraying machine. A portion of the bottles were single sprayed and the remainder were double sprayed. The double sprayed bottles were not cured between sprays. Both the single sprayed and double sprayed bottles were cured for one hour at a temperature between 190° F. and 210° F. The lined bottles were then filled with hexane, toluene, ethyl acetate and carbon tetrachloride and stored at 73° F. for twelve days. The results obtained in comparison with unlined control bottles are shown below.

*Weight loss—grams per day per bottle*

| Test Fluid | Unlined Bottles | Double Liner | Single Liner |
|---|---|---|---|
| n-Hexane | 2.2 | 0.0066 | 0.0179 |
| Toluene | 2.79 | 0.0071 | 0.0342 |
| Ethyl Acetate | 0.095 | 0.0004 | 0.0379 |
| Carbon Tetrachloride | 3.49 | 0.0081 | 0.0427 |

EXAMPLE V

Resin A and resin B were admixed in a ratio of 10:1. Four parts of the admixture of resin A and resin B were then admixed with one part of hardener C. The mixture was then dissolved in sufficient methyl ethyl ketone to provide a solids content of 65%. Four-ounce Boston Round polyethylene bottles were spray lined with the resulting solution as in Example IV and the lined bottles were cured at 200° F. for one hour. The lined bottles and unlined control bottles were then filled with a commercial tobacco spray containing 50% of a petroleum hydrocarbon solvent, the active insecticidal ingredients and an anionic emulsifier. The filled bottles were stored at 73° F., 100° F. and 120° F. The weight loss and bottle appearance at the end of twenty-eight days is shown in the table below.

| Bottle Identification and Temperature | Calculated Weight Loss Per Year (Gms.) | Appearance of Bottles |
| --- | --- | --- |
| Controls, 73° F | 31.85 | Collapse. |
| Controls, 100° F | 99.20 | Do. |
| Controls, 120° F | 161.3 | Do. |
| Lined, 73° F | .504 | Good. |
| Lined, 100° F | 2.78 | Do. |
| Lined, 120° F | 6.78 | Do. |

EXAMPLE VI

Resin A and resin B were again admixed in a ratio of 10:1. Three and two tenths parts of this mixture were then admixed with one part of hardener C and diluted with methyl ethyl ketone to a solids content of 65%. Four-ounce Boston Round polyethylene bottles were manually lined by the pour-in, pour-out technique and the liners were cured one hour at 200° F. The cured liners averaged 0.392 gram in weight. Several lined bottles were filled with each of n-hexane, toluene, ethyl acetate and carbon tetrachloride and the filled bottles were stored at 73° F. for 156 days. The following average daily weight losses were obtained at thirty days and 156 days as compared with the unlined controls.

*Weight loss—grams per day per bottle*

| Test Fluid | Unlined | 30 Days—Lined | 156 Days—Lined |
| --- | --- | --- | --- |
| n-Hexane | 2.2 | 0.0069 | 0.0070 |
| Toluene | 2.79 | 0.0093 | 0.0085 |
| Ethyl Acetate | 0.095 | 0.0041 | 0.0035 |
| Carbon Tetrachloride | 3.94 | 0.0096 | 0.0134 |

EXAMPLE VII

Resin A and resin B were again admixed in a ratio of 10:1. Five and two tenths parts of this mixture were then admixed with one part of hardener C and diluted with methyl ethyl ketone to a solids content of 65%. Four-ounce Boston Round polyethylene bottles were manually lined by the pour-in, pour-out technique and the liners were cured one hour at 200° F. The cured liners averaged 0.392 gram in weight. Several lined bottles were filled with each of n-hexane, toluene, ethyl acetate and carbon tetrachloride and the filled bottles were stored at 73° F. for 153 days. The following average daily weight losses were obtained at twenty-seven days and at 153 days as compared with the unlined controls.

*Weight loss—grams per day per bottle*

| Test Fluid | Unlined | 27 Days—Lined | 153 Days—Lined |
| --- | --- | --- | --- |
| n-Hexane | 2.2 | 0.0107 | 0.0104 |
| Toluene | 2.79 | 0.010 | 0.0087 |
| Ethyl Acetate | 0.095 | 0.0028 | 0.0037 |
| Carbon Tetrachloride | 3.94 | 0.0192 | 0.0186 |

From the foregoing examples, it is apparent that the coating of the surface or the lining of a container or bottle with the cured epoxy resin composition of the invention will result in greatly decreased permeation of the article or container by many of the commercially employed fluids. Moreover, the coated surfaces of the invention are additionally beneficial in preventing passage of gases, such as oxygen, through the plastic substrate. Consequently, synthetic resin, and particularly polyethylene, containers and bottles may be satisfactorily employed as containers for such materials or compositions containing these materials when the containers are lined with a cured epoxy resin in accordance with the present invention.

While it is not desired to be bound by the theory here expressed, it is believed that the increased flexibility characterizing the cured epoxide liners or coatings in accordance with the invention results from the admixture of a cured epoxide A containing as a constituent thereof an epoxide resin having three reactive epoxy groups to the molecule with the uncured epoxide B which possesses only two reactive epoxide groups positioned at opposite ends of a relatively long straight chain molecule. This particular combination when cured by use of a conventional hardener for epoxide resins appears to produce a molecule having sufficient cross-linking to give adequate barrier effect to reduce permeation by organic fluids but at the same time containing sufficient spacing between the cross-linked portions to produce the enhanced flexibility characterizing the compositions of the invention.

It often is beneficial to irradiate the lining or coating solution during the curing procedure. Not only does irradiation accelerate the normal cross-linking reaction but often effects a graft polymerization whereby the epoxy and/or hardening agent is chemically combined with the substrate, thus greatly enhancing the adherence of the coating or lining to the substrate.

Although in the examples particular emphasis has been placed on the popular polyethylene bottle, it is also within the scope of the invention that coatings and/or linings of the cured epoxy resin composition of the invention be employed with other synthetic resinous articles which are permeable to organic fluids such as carbon tetrachloride, hexane, acetone, benzene, toluene, and the like. The invention is broadly applicable to plastic articles or containers fabricated from all types of thermo-plastic or thermo-setting resins. More specifically, the invention is applicable to articles or containers fabricated from such materials as polyethylene, including conventional polyethylene and the so-called new type low temperature polyethylene, such as Ziegler polyethylene, polymethylene or polyethylene substantially free of branched chains, polyethylene terephthalate, polytetrafluorethylene, nylon, acetate copolymers, ethylene-polyvinyl acetate copolymers, coumarone resins; indene resins; acetylene polymers, including their halogenated derivatives; polymers of olefin hydrocarbons other than ethylene, including polymers of isoprene, butadiene and their homologues, and halogen-substituted derivatives thereof; olefin-sulfur dioxide resins; phenol-aldehyde resins; aldehyde resins; furfural resins; ketone resins; urea-formaldehyde type resins; including thiourea-formaldehyde, melamine formaldehyde, and dicyandiamide-formaldehyde resins; amine-aldehyde resins; sulfonamide-aldehyde resins; nitro resins; resins from such nitrogen containing materials as hydrazine and related substances, pyrazoles, pyridine, quinoline, pyorrole, indole and carbazole; condensation polyester resins, including resins obtained from polyhydric alcohols and polybasic acids, and from hydroxy acids; polyamide resins and derivatives thereof; mixed polyester-polyamide resins; polyether resins; polyvinyl ethers; polyvinyl alcohols; polyvinyl esters; rubber and its derivatives; cellulose esters and cellulose ethers. All of these plastic materials may be used with any of the usual modifying agents including plasticizers, pigments, fillers, dyes and materials which combine chemically with the polymer ingredients either during formation of the polymer or during an after treatment. Thus, surfaces and containers fabricated from copolymers, interpolymers and mixtures of polymers may be advantageously rendered less permeable to organic fluids by application of a coating or lining of a cured epoxy resin.

As indicated, containers or bottles may, in accordance with the invention, be coated or lined on either the interior or exterior surfaces or both. Where the problem involved is merely the prevention of moisture from entering the product to be packaged or to prevent gases from the atmosphere from contacting the contents of the container, an external impermeable coating is satisfactory. However, from the standpoint of the permeation of a liquid within a container outwardly through the container walls, it is greatly preferred to employ an interior lining or coating. Moreover, with an external coating, an ingredient of the fluid content may be essential, although quantitatively small, and consequently such ingredient may be lost by absorption in the container wall even though the ingredient does not escape from the bottle itself. This latter situation is especially important where the containers are employed for skin lotions, perfumes, foods, liquors and the like, in which the essential oil fraction governing the perfume odor is relatively small. Accordingly, despite the proportionally greater difficulty of applying a lining to the container's interior, the advantages of such an inner lining are such that it is preferred. In some instances it may be desirable to apply both an interior and exterior lining.

The mechanical methods of applying the coating or lining to the container surfaces are well known to the art and do not constitute a part of the present invention. Specific details of the operation and functioning of spray coating units may be found in Paasche Patents 2,547,884, 2,059,706 and 2,069,844.

Since modifications of the disclosed invention will be apparent to those skilled in the art, it is intended that the invention be limited only by the scope of the appended claims.

What is claimed is:

1. A synthetic resinous article having a surface characterized by enhanced resistance to permeation by fluids, said surface having a coating of the cured mixture of: (A) an epoxy resin composition containing by weight from about 90% to about 10% of the reaction product of epichlorhydrin, p,p' - dihydroxy-diphenyldimethyl methane and epihydric alcohol and from about 10% to about 90% of the reaction product of epichlorhydrin and dimethyl, p-hydroxyphenyl, p-hydroxy-o-(p-hydroxybenzyl) phenyl methane, and (B) the reaction product of epichlorhydrin and p,p'-dihydroxy-diphenyldimethyl methane; said A and B being admixed in a ratio of between about 1:1 and about 50:1.

2. An article according to claim 1 in which the epoxy resins are cured by a polyamine.

3. An article according to claim 1 in which the epoxy resins are cured by a polyamine admixed with the said resins in a ratio of between 1:1 and 1:10 by weight.

4. An article according to claim 1 in which the epoxy resins are cured by a bis-phenyl polyamine admixed with the said resins in a ratio of between 1:1 and 1:10 by weight.

5. A polyethylene container having a surface characterized by enhanced resistance to permeation by organic fluids, said surface having a coating of the cured mixture of: (A) an epoxy resin composition containing by weight from about 90% to about 10% of the reaction product of epichlorhydrin, p,p'dihydroxy-diphenyldimethyl methane and epihydric alcohol and from about 10% to about 90% of the reaction product of epichlorhydrin and dimethyl, p-hydroxyphenyl, p-hydroxy-o-(p-hydroxybenzyl)phenyl methane, and (B) the reaction product of epichlorhydrin and p,p'dihydroxy-diphenyldimethyl methane; said A and B being admixed in a ratio of between about 1:1 and about 50:1.

6. A container according to claim 5 in which the epoxy resins are cured by a polyamine.

7. A container according to claim 5 in which the epoxy resins are cured by a polyamine admixed with the said resins in a ratio of between 1:1 and 1:10 by weight.

8. A container according to claim 5 in which the epoxy resins are cured by a bis-phenyl polyamine admixed with the said resins in a ratio of between 1:1 and 1:10 by weight.

9. A polyethylene bottle of increased resistance to permeation by organic fluids, at least one surface thereof having a coating of the cured mixture of: (A) an epoxy resin composition containing by weight from about 90% to about 10% of the reaction product of epichlorhydrin, p,p'dihydroxy-diphenyldimethyl methane and epihydric alcohol and from about 10% to about 90% of the reaction product of epichlorhydrin and dimethyl, p-hydroxyphenyl, p-hydroxy-o-(p-hydroxybenzyl) phenyl methane, and (B) the reaction product of epichlorhydrin and p,p'dihydroxy-diphenyldimethyl methane; said A. and B being admixed in a ratio of between about 1:1 and about 50:1.

10. A bottle according to claim 9 in which the epoxy resins are cured by a polyamine.

11. A bottle according to claim 9 in which the epoxy resins are cured by a polyamine admixed with the said resins in a ratio of between 1:1 and 1:10 by weight.

12. A bottle according to claim 9 in which the epoxy resins are cured by a bis-phenyl polyamine admixed with the said resins in a ratio of between 1:1 and 1:10 by weight.

13. A bottle according to claim 9 in which the coating is on the exterior surface.

14. A bottle according to claim 9 in which the coating is on the interior surface.

15. A polyethylene container of increased resistance to permeation by organic fluids comprising a chemically pretreated surface receptive to polar compounds, said surface having a strongly adherent coating of the cured mixture of: (A) an epoxy resin composition containing by weight from about 90% to about 10% of the reaction product of epichlorhydrin, p,p'dihydroxy-diphenyldimethyl methane and epihydric alcohol and from about 10% to about 90% of the reaction product of epichlorhydrin and dimethyl, p-hydroxyphenyl, p-hydroxy-o-(p-hydroxybenzyl) phenyl methane, and (B) the reaction product of epichlorhydrin and p,p'dihydroxy - diphenyldimethyl methane; said A and B being admixed in a ratio of between about 1:1 and about 50:1.

16. A container according to claim 15 in which the epoxy resins are cured by a polyamine.

17. A container according to claim 15 in which the epoxy resins are cured by a polyamine admixed with the said resins in a ratio of between 1:1 and 1:10 by weight.

18. A container according to claim 15 in which the epoxy resins are cured by a bis-phenyl polyamine admixed with the said resins in a ratio of between 1:1 and 1:10 by weight.

19. A container according to claim 15 in which the coating is on the exterior surface.

20. A container according to claim 15 in which the coating is on the interior surface.

References Cited in the file of this patent

UNITED STATES PATENTS

| | | |
|---|---|---|
| 2,444,333 | Castan | June 29, 1948 |
| 2,491,947 | Bardash | Dec. 20, 1949 |
| 2,811,468 | Joffre | Oct. 29, 1957 |

UNITED STATES PATENT OFFICE

Certificate

Patent No. 2,836,319             Patented May 27, 1958

Jules Pinsky, Albert E. Adakonis, and Alvin R. Nielsen

Application having been made by Jules Pinsky, Albert E. Adakonis, and Alvin R. Nielsen, the inventors named in the patent above identified; and Plax Corporation, Bloomfield, Connecticut, a corporation of Delaware, the assignee, for the issuance of a certificate under the provisions of Title 35, Section 256, of the United States Code, deleting the name of the said Albert E. Adakonis as a joint inventor, and a showing and proof of facts satisfying the requirements of the said section having been submitted, it is this 3rd day of December 1968, certified that the name of the said Albert E. Adakonis is hereby deleted from the said patent as a joint inventor with the said Jules Pinsky and Alvin R. Nielsen.

EDWIN L. REYNOLDS,
*First Assistant Commissioner of Patents.*

[SEAL]